United States Patent [19]
Chen et al.

[11] Patent Number: 5,590,197
[45] Date of Patent: Dec. 31, 1996

[54] ELECTRONIC PAYMENT SYSTEM AND METHOD

[75] Inventors: James F. Chen; Jieh-Shan Wang, both of Potomac, Md.

[73] Assignee: V-ONE Corporation, Rockville, Md.

[21] Appl. No.: 416,045

[22] Filed: Apr. 4, 1995

[51] Int. Cl.$^6$ ........................................... H04L 9/00
[52] U.S. Cl. ................... 380/24; 380/4; 380/49; 380/30
[58] Field of Search .............................. 380/3, 4, 23, 24, 380/25, 49, 30

[56] References Cited

U.S. PATENT DOCUMENTS

| | | | |
|---|---|---|---|
| 5,373,561 | 12/1994 | Haber et al. | 380/49 |
| 5,511,122 | 4/1996 | Atkinson | 380/25 |

*Primary Examiner*—David C. Cain
*Attorney, Agent, or Firm*—Bacon & Thomas

[57] ABSTRACT

A cyber wallet in the form of stored and protected account information, which may be "carried" on a tamper resistant portable electronic storage medium such as a smartcard, or stored on the customer's computer (or personal digital assistant, PCMCIA card, or the like) together with the browser/mosaic software, is provide to a customer for the purpose of making electronic payments from the possessor of the wallet to a merchant at a remote site on the Internet. Security of the information contained in the wallet is provided by a public key file containing public keys to be used for encrypting the payment information into an authorization ticket which is sent by the wallet to the merchant, and then forwarded to the account servicer for decryption, the decryption key being in the form or a private key held only by the account servicer, and to which the merchant and other parties have no access. The public key rile preferably contains a plurality or public keys selectable by an identifier associated with but not a part of the key itself, so that the account servicer can control, by having the merchant send an identifier to the wallet, the selection of uncompromised keys without anyone but the servicer having knowledge of which key is being selected.

12 Claims, 1 Drawing Sheet

ELECTRONIC PAYMENT SYSTEM AND METHOD

BACKGROUND OF THE INVENTION

1. Field of the Invention

This invention relates to a new type of financial entity referred to as a "cyber wallet." The cyber wallet consists of information and files which enable the holder to safely carry out transactions requiring electronic payment over an open communications network, as well as hardware necessary to carry out the transactions.

In describing the invention, the provider of services or goods will be referred to as a "merchant," and the provider of the wallet, which will typically be a credit card company, bank, or account servicer, will be referred to as the "servicer." In addition, it will be appreciated by those skilled in the art that the cyber wallet can be used for a variety of transactions, including both credit and debit type transactions, although for convenience the term "credit" will be used to describe all such transactions.

2. Description of Related Art

In a conventional point-of-sale credit transaction, the purchaser physically presents a credit card to a merchant who verifies the authentication information by comparing a signature on the card with the cardholder's signature, and reads the account number from the card so that it can be transmitted to the credit card servicer for authorization.

The level of security for the parties who have a stake in the transaction, i.e., the authorized owner of the card, the merchant, and the credit card company, depends on two factors: the ability of the merchant to authenticate the card by comparing signatures and recognizing a forgery, the ability and honesty of the merchant in protecting the account information necessary to carry out the transaction.

Much attention has recently been paid to the problem of card authentication. For example, secret codes or PIN numbers have been relatively widely implemented to prevent access to the information on the card unless the cardholder is an unauthorized user of the card. In addition, a variety of proposals have been made for further verifying the authenticity of the card to ensure that the card is not a forgery. For example, copending U.S. patent application Ser. No. 08/285,234, discloses a system which completely eliminates the risk of card forgery, and at the same time provides for verification of the identity of the cardholder using a PIN number system, virtually eliminating the risk that the card is a forgery and that the presenter of the card, disclosed as a chip card, is not an authorized user of the card. In this system, the card had stored thereon, together with the account information, a forgery proof digital signature generated using the private key of a private-public key cryptosystem, and which can be verified by anyone with a stake in the transaction using the public key of the cryptosystem.

On the other hand, much less attention has been paid to the problem of protecting the transaction facilitating information once the card has been authenticated, and in particular to the problem of misuse of the information by the merchant. Protection in this area has traditionally relied on the card owner's knowledge of the legitimacy of the merchant, which is reasonable when the card owner is at the point-of-sale and can rely on the merchant's investment and need to maintain a reputation. Protection is less likely when the card owner is not at the point-of-sale, however, and the transaction is being carried out by telephone, but at least the customer can rely on government regulation of telephone solicitors, and the investment necessary to maintain a phone bank and advertising. While fraud on the part of merchants, and of third party interceptors of the credit information has been a source of substantial losses to customers and credit card companies, the risk has generally been viewed as unavoidable and offset by the convenience of credit card transactions.

This balance between convenience and risk has now been substantially altered by the development of a new form of electronic communications, namely the Internet, in which the only investment necessary to set up as a merchant is a personal computer and an Internet account, in which the merchant and customers may be spread around the globe, and in which there is no effective regulation of the flow of information and who has access to the information.

Unless information access to the credit payment and verification is strictly controlled, and the user providing his credit card number in payment to a merchant can be reasonably certain that the merchant is legitimate and that no unauthorized users will have access to the payment information, remote purchases still carry unacceptably high risks from the point-of-view of the consumer and/or the company or bank which guarantees payments made using the card.

Despite these risks, there is a rapid trend towards increasing use carrying out transactions over the least controlled public network available, namely the Internet. In such transactions, the "merchant" is often nothing more than an electronic address, and it is impossible for anyone to ensure that whoever is receiving the payment information is legitimate. Thus, such remote electronic transactions carry significant risks for both the customer and the credit provider. The customer is faced with the problem of misuse of his or her account information, either by someone who has intercepted the information, or by a dishonest or compromised merchant, while the credit issuer is faced with the problem of verifying that a request for payment from a merchant is in response to a legitimate order.

The Internet was originally designed as a way of communicating research information, but recent advances in communications and computer technology has made access to the Internet available to a mass world-wide audience. To a merchant, the Internet is potentially not only a way of transmitting information, but also a way of bringing a global market to his or her doorstep. In practice, however, the lack of an effective way of securing transfers of funds has prevented optimal utilization of the Internet's potential as a global marketplace for goods and services as well as ideas.

In order to be useful, a system of electronic payments must provide not only protection of account information and authentication of all information having to do with the transaction, but also should be compatible with the existing infrastructure of credit card issuers, without the need for significant added hardware, and it should be exportable, i.e., in compliance with U.S. export restrictions on the export of mass encryption technology. Thus, conventional cryptographic systems alone cannot solve the problems of Internet commerce and unlikely ever to be implemented, because while key distribution systems are in theory possible in which only the purchaser and merchant have access to communications between them, such systems are complicated and relatively expensive due to the need for a secured third party key server at both ends of the transaction, because cryptographic technology cannot be freely distributed over the Internet due to export restrictions by the U.S. government, and because of the more fundamental problem that even if communications with a merchant are protected, there is no guarantee that the merchant will protect the information or even that the intended recipient of the information will not misuse it.

It is true that in any transaction, someone must be trusted. However, most consumers and merchants would agree that the party to be trusted is not the purported consumer or the merchant, but rather the credit card company (or bank), which can more easily be regulated by appropriate watchdog agencies, and which is the party that ultimately carries the risk of a fraudulent transaction.

The system disclosed herein builds upon the protection provided by the card authentication provisions disclosed in the above-cited copending application, which ensures that the token or card containing information on the purchaser's right to participate in the transaction, and provides a new way of protecting that conveying that information to the credit card servicer without significant risk of misuse by the merchant or any other party capable of intercepting the information after the card has been authenticated and the necessary information retrieved and it does so using well known public-private key cryptographic technology which fully protects the public interest in preventing the use of cryptography for criminal purposes.

Furthermore, the system described herein greatly expands upon the concept of the credit card itself, with the information provided to the customer by his credit card issuer or bank being contained in the form of a "cyber wallet," whose utility will become apparent to those skilled in the art based on the following description.

SUMMARY OF THE INVENTION

It is accordingly a principal objective of the invention to enable a party to make electronic payments using a new payment medium referred to herein as the cyber wallet. The cyber wallet may be thought of as an expansion of the credit card concept into a concept involving multiple cards with multiple issuers in a convenient package designed to enable the holder of the cyber wallet to make purchases over the vast global communications network known as the Internet, with full protection of the electronic payment information from not only eavesdroppers, but also from remote merchants, without the need to verify the trustworthiness of the merchant.

It is a further objective of the invention to provide a system of electronic payment which has the advantages described above and which further can easily be utilized in connection with the system and method described in U.S. patent application Ser. No. 08/285,134, in order to ensure the authenticity of the payment information itself and prevent forgeries of the "cyber wallet," thereby providing protection for all parties to the cyber transaction.

It is another objective of the invention to provide a system and method for enabling a merchant to collect account information from remote purchasers over an unsecured public data communications network, which uses the existing credit card verification and servicing infrastructure with minimal hardware additions.

It is yet another objective of the invention to provide a system and method for enabling a merchant to collect account information from remote purchasers over an unsecured public data communication network, which utilizes exportable EDI technology.

These objectives are achieved, in accordance with the principles of a preferred embodiment of the invention, by providing at the customer end/user side of the system, an electronic wallet in the form of stored and protected account information, which may be "carried" on a tamper resistant portable electronic storage medium such as a smartcard, or stored on the customer's computer (or personal digital assistant, PCMCIA card, or the like) together with the browser/mosaic software which will enable the customer to utilize the wallet for transactions carried out on the Internet, and by also providing in the wallet a public key file containing public keys to be used for encrypting information necessary to carry out a remote transaction, the decryption key being in the form of a private key held only by the account servicer, and to which the merchant and other parties have no access.

As a result, a customer in possession of the wallet can easily make purchases from any merchant on the Internet or WorldWide Web by simply causing the a public key encrypted authorization ticket to be transmitted to the merchant, the merchant then forwarding the ticket to the account servicer for decryption and approval of the transaction based on the status of the customer's account and the amount of the transaction supplied to the account servicer with the ticket.

In an especially preferred embodiment of the invention, the public keys are held only by the possessor of the wallet, and control of the keys by the account servicer is maintained by having the merchant forward to the wallet a public key identifier for selecting a key, thus allowing the account servicer to change the keys associated with a merchant or prevent the use of unauthorized keys, without the merchant or any third party ever having access any of the public keys in the wallet, and without any involvement on the part of the customer or his or her wallet.

BRIEF DESCRIPTION OF THE DRAWINGS

The FIGURE is a schematic diagram of a system of enabling secure electronic payments over an unsecured network according to a preferred embodiment of the invention.

DETAILED DESCRIPTION OF THE PREFERRED EMBODIMENTS

Figure 1:
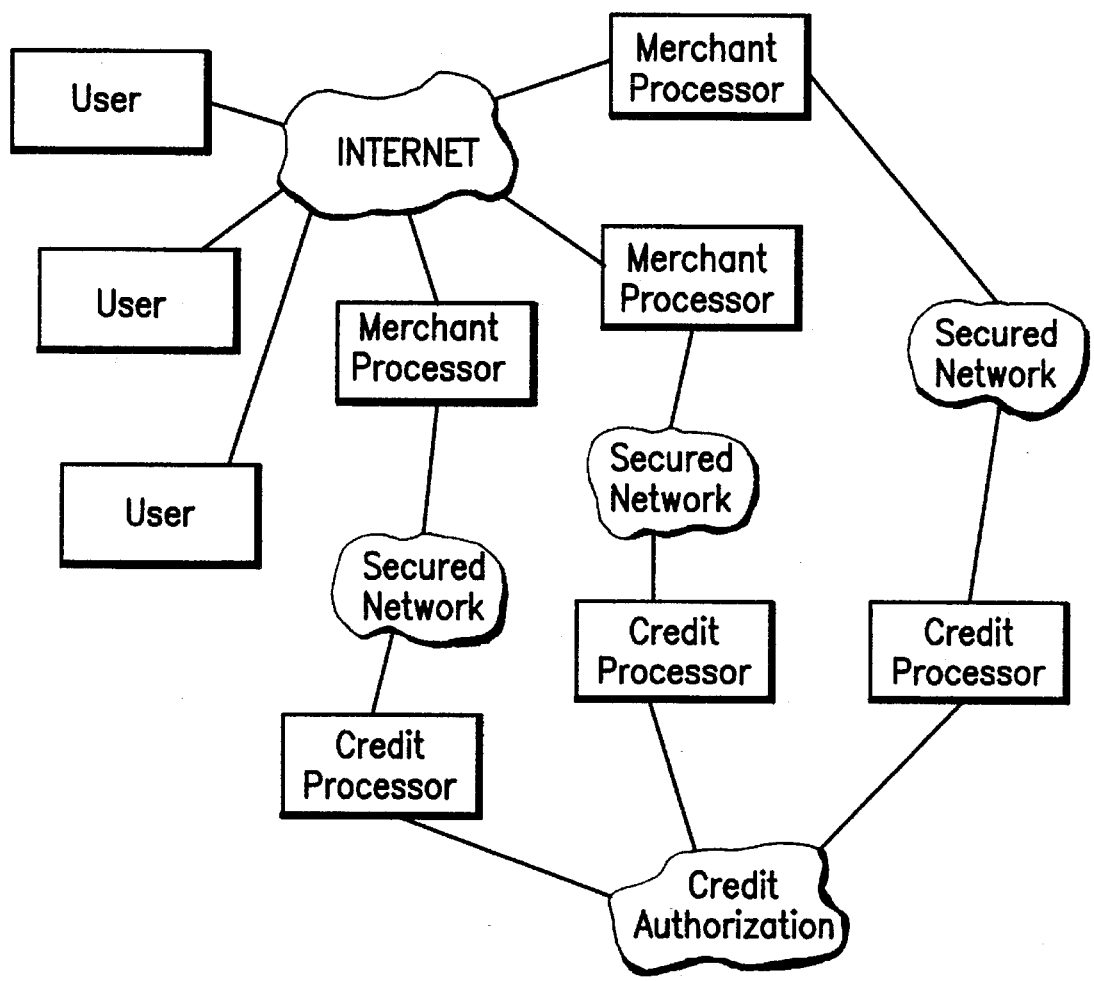

FIG. 1 shows the overall architecture of the preferred system for utilizing an open communication network such as the Internet as a medium for the transfer of credit card account information. The system on which the cyber wallet is utilized includes a plurality of users, each provided with an individual cyber wallet, the users being connected to a plurality of merchant processors over the Internet (for example, by means of the World-Wide Web). Each of these merchant processors is connected by means of a secured network or by means of a secret tunneling or other channel protecting procedure to a credit processor held by at least one account servicer. As will be described in more detail below, payment information is transferred from a user to a merchant processor in the form of a public key encrypted authorization ticket, which is then forwarded by the merchant to the credit processor. All unprotected communications over the Internet are presumed to be accessible by unauthorized parties, and all merchants are subject to suspicion. The credit processors, however, are presumed to be secure and trustworthy.

The cyber wallet on which the preferred system and method is based is in the form of any account and/or personal information required to be transmitted to the account servicer in order to verify the account status, and which may be "carried" on a tamper resistant portable electronic storage medium such as a smartcard, or stored on the customer's computer (or personal digital assistant, PCMCIA card, or the like) together with the browser/mosaic software which will enable the customer to utilize the wallet for transactions carried out on the Internet, and a public key file which will be described below. For some purposes, information in the wallet could also be accessible solely through use of a PIN mechanism, such as might be included in a smart card of the type described in the copending application cited above, in order to ensure compatibility with such systems.

It should be appreciated that the particular information contained on the card will vary depending on the requirements of the account servicer, as will the particular browser software included in the wallet. These elements per se are not part of the invention, but rather it is their combination with the public key file and the manner in which they are used to carry out a transaction that constitutes the invention.

Those skilled in the art should also appreciate that, although the "wallet" may be contained in a smartcard or other physical device, it may also exist purely as software (which is why the "wallet" is referred to herein as a "cyber wallet"). This is not to say that the cyber wallet is merely a virtual or abstract concept, however. The cyber wallet does exist in static physical form, in the form of instruction stored in a memory device, or programmed into the wiring of an integrated circuit, and will be used by the customer in the same manner as a credit card.

In one embodiment, for example, the cyber wallet is contained on a smartcard which can be inserted into a card reader in a manner similar to the manner in which existing credit or debit cards are used, without the need for entry of additional information. In this embodiment, the cyber wallet can be provided on the card using the procedures described in the above-mentioned copending U.S. patent application Ser. No. 08/285,134. In another embodiment, however, the cyber wallet is in the form of software provided to the consumer by his credit card company or bank, and may be stored on the consumer's personal computer rather than being physically carried around like a smartcard.

In either case, the cyber wallet includes what ever information is needed by the account servicer to authorize a transaction and, uniquely, a file containing a plurality of public keys. These public keys are an important feature of cyber wallet because it is these keys that are used to protect the information on the card as it is being transmitted to the merchant. Essentially, the concept of the key file is to use one of the public keys of a public-private key cryptosystem to encrypt the necessary information and send the encrypted information in the form of an "authorization ticket," which can then be forwarded by the merchant together with order information, as necessary, to the account servicer/authenticator in order to obtain authorization from the account servicer which allows the transaction to be completed. By using public keys to encrypt the information, so that the information can only be decrypted by the party in possession of the associated private key, the information can be fully protected as it is passed electronically to the merchant, and from the merchant to the account servicer.

The inclusion of a public key file in the cyber wallet is to be distinguished from the inclusion of card authentication information. As noted above, the authenticity of the information can be made fully verifiable by using the method described in copending U.S. patent application Ser. No. 08/285,134, in which the information is associated with a digital signature which may be decrypted by anyone in possession of a public key. The present invention involves public key encryption of any information contained in the wallet which is necessary to authenticate the transaction, and private key decryption, the private key being held under secured conditions by the account servicer who carries the ultimate risk of any fraud.

As an additional measure of security, the public key file contained in the wallet contains means for varying the public key used to encrypt the authorization ticket, thus reducing the likelihood that one of the keys could be compromised.

Use of the cyber wallet is carried out as follows:

First, the wallet is created by the account servicer or provider under secured conditions, by gathering together all information necessary to carry out credit transactions remotely over the Internet, including browser/mosaic software if necessary, account information, a user PIN number, a user ID, MAC, and any other information which might be needed during the payment and authentication process. This information is associated with a public key file preferably containing a plurality of public keys associated with a single root key, and key identifiers. The entire wallet is then provided to the customer, in any form which enables the customer to utilize the wallet, for example as a software package for use on the customer's portable computer, or on a smart card which can be carried around by the customer and used at kiosks provided with smart card readers.

When a transaction is to be carried out, the customer selects the appropriate wallet, depending for example on which "credit card" he or she wishes to use, by retrieving the software from a disk, or inserting a smart card into a card reader, and establishes communications with the merchant. The customer then makes an order and the merchant requests an authorization ticket in the form of payment or account information encrypted by one of the public keys in the public key file. Selection of the public key may be in response to transmission from the merchant of a public key identifier associated with the public key. If the card has been inserted into a card reader, or if the software has been provided with provision for accepting a PIN number, entry of the PIN number can be required to proceed with the transaction at this time to unlock the information stored in the wallet or to verify the user identity as part of the credit card verification, and in addition the authenticity of information in the wallet can be verified using the techniques described in copending U.S. patent application Ser. No. 08/285,134.

When the merchant receives the authorization ticket, the merchant then embeds or associates it with whatever information the merchant needs to provide the account servicer. The authorization ticket is then forwarded to the account servicer, at which point the account servicer uses the private key associated with the selected public key in order to decrypt the file and verify the status of the account. If the transaction is approved, the account servicer then sends an approval message back to the merchant, together with decrypted information necessary for the merchant's records.

It will of course be appreciated by those skilled in the art that rather than changing public keys by having the merchant instruct the cyber wallet which of a plurality of keys to use based on a key identifier, which may for example be provided to the merchant by the account servicer, which can thus prevent the use of compromised keys, a public key can be replaced by other means, for example by including provision in the cyber wallet for decrypting a new public key which has been encrypted by the old private key. Also, it is possible to provide for cyber wallets containing the necessary public key file and browser software to be downloaded by a merchant to a customer, rather than supplied by the "credit card" company directly to the customer, with the user adding the account and personal information necessary to effect a transaction, in which case the private key will still be held by the account servicer and the merchant will still have no access to any information in the authorization ticket which it forwards from the customer to the account servicer.

Having thus described a preferred embodiment of the invention in sufficient detail to enable those skilled in the art to make and use the invention, it should therefore nevertheless be appreciated that numerous modifications and variations of the basic "cyber wallet" concept, and it is intended that the invention encompass all such modifications and variations without limitation to the details of the preferred embodiments described above. To the contrary, it is intended that the above description not be taken as limiting, but rather that the invention be defined solely by the appended claims.

We claim:

1. An electronic payment system, comprising:
   storage means for storing sensitive account information, at least one browser program, and a public key file, said at least one browser program constituting a means for enabling communications with at least one merchant over an open computer network, and said public key file including means for selecting the public key of a private-public key cryptosystem and for encrypting the sensitive information using the public key to generate an authorization ticket;
   means possessed by a merchant in communication with the storage means for receiving said authorization ticket from the storage means and forwarding it to a secured account processor;
   means in the account processor including a private key for decrypting the authorization ticket and informing the merchant whether a transaction is authorized.

2. A system as claimed in claim 1, wherein the storage means is in the form of a software program distributed by a credit card company or the merchant to a customer for use on the customers own modem-equipped computer.

3. A system as claimed in claim 1, wherein the storage means is provided on a smart card for use in kiosks equipped with smart card readers.

4. A system as claimed in claim 1, wherein the storage means further includes means including a private key encrypted digital signature for verifying whether said sensitive account information is authentic.

5. A system as claimed in claim 1, further comprising means for allowing access to the account information via a PIN mechanism, so that the storage means can be used in situations where encryption of the information is not necessary.

6. A system as claimed in claim 1, wherein the public key file includes a plurality of public keys retrievable based on identifiers associated therewith, one of the identifiers at a time being supplied to the merchant by the account servicer in order to enable the account servicer to control the selection of public keys without access by the merchant to the public keys themselves.

7. An electronic payment method, comprising the steps of:
   providing a customer with account information personal to the customer, at least one browser program for enabling communications with at least one merchant over an open computer network, and a public key file including means for selecting the public key of a private-public key cryptosystem;
   upon establishment of communications between the customer and a merchant, generating an authorization ticket made up, at least in part, of said account information which has been encrypted by a selected public key from the public key file;
   transmitting the authorization ticket to the merchant;
   upon receipt of the authorization ticket by the merchant, adding information pertaining to an order and forwarding the information pertaining to the order and the authorization ticket to a secured account processor;
   decrypting the authorization ticket using the private key of said public-private key cryptosystem so that the information contained therein can be used to verify whether the transaction is to be permitted.

8. A method as claimed in claim 7, wherein the step of providing the customer with personal account information, at least one browser program, and a public key file comprises the step of distributing a software program to a customer for use on the customers own modem-equipped computer, said step of distributing the software program being carded out by a credit card company or merchant.

9. A method as claimed in claim 7, wherein the step of providing the customer with personal account information, at least one browser program, and a public key file comprises the step of providing at least the personal account information and public key file on a smart card for use in kiosks equipped with smart card readers.

10. A method as claimed in claim 7, further comprising the step of providing the customer with a private key encrypted digital signature for verifying whether the personal account information is authentic.

11. A method as claimed in claim 7, wherein the public key file includes a plurality of public keys retrievable based on identifiers associated therewith, and further comprising the steps of having the account servicer supply the merchant with a key identifier and, during a transaction, having the merchant supply the key identifier to an electronic storage device on which said personal account information and public key file are stored in order to enable the account servicer to control the selection of public keys via the merchant without the merchant having access to the public keys themselves.

12. A method as claimed in claim 1, further comprising the step of allowing access to the account information via a PIN mechanism, so that the wallet can be used in situations where encryption of the information is not necessary.

* * * * *